E. J. BROWN.
OPTICAL INSTRUMENT.
APPLICATION FILED MAR. 16, 1916.

1,207,271.

Patented Dec. 5, 1916.
6 SHEETS—SHEET 1.

E. J. BROWN.
OPTICAL INSTRUMENT.
APPLICATION FILED MAR. 16, 1916.

1,207,271. Patented Dec. 5, 1916.
6 SHEETS—SHEET 2.

Witness:
John Enders

Inventor:
Earl J. Brown
by Fred Gerlach
his Atty.

E. J. BROWN.
OPTICAL INSTRUMENT.
APPLICATION FILED MAR. 16, 1916.

1,207,271.

Patented Dec. 5, 1916.
6 SHEETS—SHEET 4.

Witness:
John Endere

Inventor:
Earl J. Brown
by Fred Gerlach
his Atty.

UNITED STATES PATENT OFFICE.

EARL J. BROWN, OF CHICAGO, ILLINOIS.

OPTICAL INSTRUMENT.

1,207,271.  Specification of Letters Patent.  Patented Dec. 5, 1916.

Application filed March 16, 1916. Serial No. 84,531.

*To all whom it may concern:*

Be it known that I, EARL J. BROWN, a citizen of the United States, and a resident of Chicago, in the county of Cook and State of Illinois, have invented certain new and useful Improvements in Optical Instruments, of which the following is a full, clear, and exact description.

In retinoscopy as heretofore practised, a tiltable mirror having a peep hole therein and rotatable to vary the plane of movement or a fixed mirror having a peep-hole therein and means mounted to move across the light path between the light-supply and mirror have been employed to progressively vary the area of the eye illuminated by the mirror, the latter practice being exemplified in Patent No. 987,951 granted to me March 28, 1911. In each instance, however, it was necessary for the operator to place his eye in a direct line behind the incident pencil of light to observe the change in the position of the illuminated area on the retina, or observe the fading of the reflex at the pupil.

One object of the present invention is to provide an improved instrument for making a retinoscopic test, in which it is not necessary to observe the fading or change of the illuminated area through a peep hole in the reflector, as was heretofore necessary.

Another object of the invention is to provide an improved device for making retinoscopic tests in which provision is made for viewing a magnified image and the fading of the area of the retina, directly illuminated, and in which the necessity of observing the eclipses on the retina through a peep hole in a reflector is avoided.

These objects of the invention are attained primarily by interposing a transparent mirror or prism in the emergent pencil of light and reflecting the image to a point of observation at one side of the pencil of light. By this construction, a magnified image of the illuminated area may be observed and by the interposition of a corrective lens in the path of the incident pencil of light, the optical defects existing in the observed eye may be neutralized so the fading on the retina will be altered sufficiently to exactly focus the lighted area and so that the optical defect may be readily and correctly determined.

A characteristic of the invention is that the pencil of light may be placed in a direct line with the observed eye, as distinguished from placement out of line therewith and reflection to the retina by a reflector, and this arrangement lends itself readily to the use of the instrument as an ophthalmoscope for making chromatic tests, for use as a corneal-microscope, and for making chromatic-retinoscopic and ophthalmoscopic tests.

A further object of the invention is to provide an improved testing instrument, which comprises all of the instrumentalities for making retinoscopic tests, either chromatic or monochromatic, ophthalmoscopic test, either chromatic or monochromatic and a corneal-microscope test.

A further object is to provide an improved device for selectively and individually cutting off the colors or different wave-lengths from the spectrum-producer for producing colors of light by mixing or recombining the rays, to adapt the instrument for monochromatic or chromatic tests.

Other objects of the invention will appear from the detailed description.

The invention consists in the several novel features hereinafter set forth and more particularly defined by claims at the conclusion hereof.

In the drawings: Fig. 9 is a section taken on line 9—9 of Fig. 1, showing the holder for the lens for recombining wave-lengths from the spectrum in making chromatic tests. Fig.

10 is a section taken on line 10—10 of Fig. 9.

The instrument comprises a suitable base 30, in which is mounted an adjustable standard 31 carrying an adjustable chin-rest 32 and a head-rest 33 for positioning the eye to be observed, which may be of any suitable construction. A standard 34 is adjustably mounted in the base, and a head 35 is formed on the upper end of said standard. A supporting-bar 36 on which the several devices for making tests are mounted, is longitudinally adjustable in the head 35, being provided with a bracket 37 which is slidable in said head and movable therein by a rack and pinion of familiar construction in the art. By this adjustment of the supporting bar 36, the eye-piece 38, which is mounted on said bar, for the observed eye, may be adjusted longitudinally into proper relation to said eye. Standard 34 is rotatably adjustable in the base to permit the supporting bar 36 and the eye-piece 38, mounted thereon, to be swung laterally in position for observation of either eye of a person. All of the devices for making the several tests hereinafter set forth are supported by the bar 36, so that longitudinal or lateral adjustment of this bar effects a conjoint shift of all of these devices.

A light housing 40 contains suitable source of light, such as a lamp, to serve as a light-supply for the instrument. In front of the housing 40, a casing 41 is adjustably mounted on the supporting bar 36 and this casing contains a condensing-lens (not shown) of usual construction. Screws 43 serve to adjustably secure the condenser-lens and casing 41 on the supporting bar 36. The front end of casing 41 is provided with an iris-diaphragm 44 of usual construction for varying the area of the pencil of light projected forwardly through said casing.

The parts thus far described are used in making substantially all tests.

Eye-piece 38 (Figs. 1 and 5) is secured to the end of a casing 47 which is mounted in one end of the supporting-bar 36.

A slide 47' (Figs. 1, 21, 22 and 23) consisting of relatively adjustable members 48 and 49, is sustained in a mount 50. The members of this slide may be adjusted to form the stenopaic slit in producing monochromatic light. The slide is transversely movable in a guide 51 fixed on mount 50 which has an opening 52 therein for the passage of light. By shifting the slide 47' transversely, the stenopaic slit may be shifted to eclipse the pencil of light, and by relative adjustment of the members 48 and 49, the area or width of the pencil of light may be varied, as desired. Mount 50 is sustained on a bracket 53, which is longitudinally adjustable on the supporting-bar 36, so that it and the devices thereon may be adjustable longitudinally into correct relation with the other parts of the instrument. A holder 53ª is provided on the back of the mount 50 to removably hold one or more supplemental lenses for varying the condensation of the light.

Figure 19:
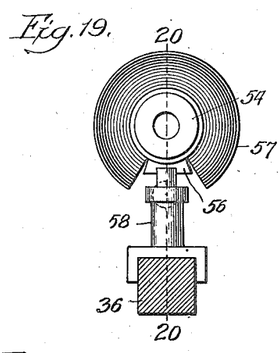
Fig. 19 is a section taken on line 19—19 of Fig. 1, showing the lens for paralleling the rays of and magnifying light from the stenopaic slit.
Figure 20:
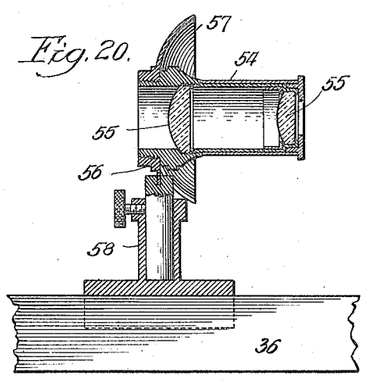
Fig. 20 is a section taken on line 20—20 of Fig. 19.
Figures 21, 22, 23:
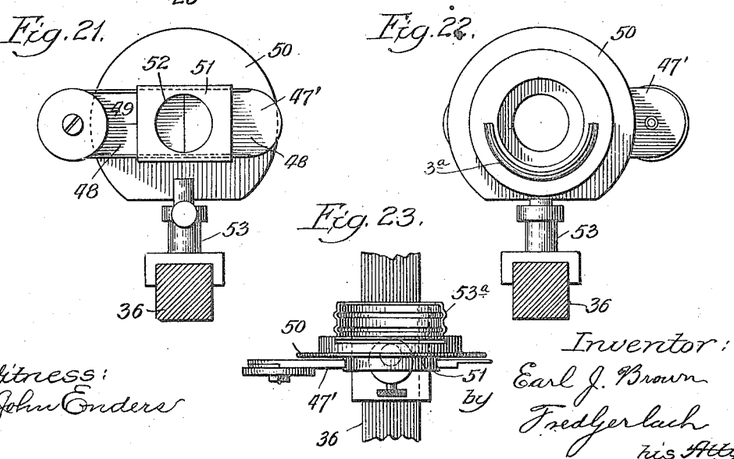
Fig. 21 is a detail of the adjustable slide for forming the stenopaic slit.
Fig. 22 is a detail of the carrier for said device, viewed from the opposite side.
Fig. 23 is a section on line 23—23 of Fig. 21.

A tube 54, containing lenses 55 (Figs. 19 and 20) is secured on a mount 56 in front of the stenopaic slide 47'. These lenses parallel the rays of light and magnify the light passing through the stenopaic slit. This mount is provided with a light shield 57, and is sustained by a bracket 58 which is slidable on the supporting bar 36, so that it can be shifted longitudinally into correct relation with respect to the other devices of the instrument.

Figure 17:
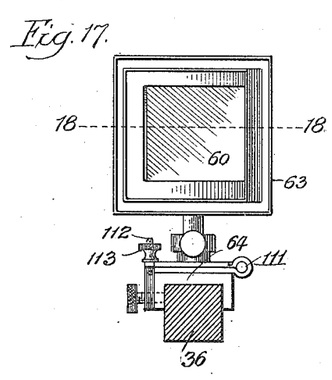
Fig. 17 is a section on line 17—17 of Fig. 1, showing the spectrum producer in elevation.
Figure 18:
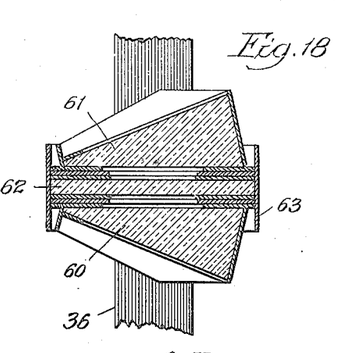
Fig. 18 is a section on line 18—18 of Fig. 17.

A spectrum producer (Figs. 1, 17 and 18) is mounted in front of the lens-holder 54 and consists of a grating comprising transparent prisms 60 and 61 and a plate 62, as well understood in the art. The prisms and plate are sustained in a suitable mount 63 carried by a bracket 64 which is longitudinally slidable on the supporting-bar 36.

Figure 15:
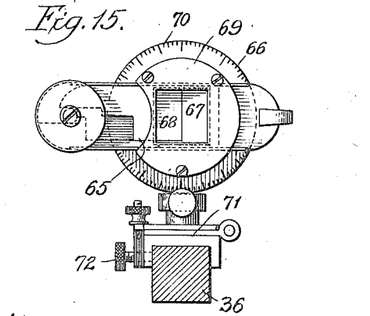
Fig. 15 is a section taken on line 15—15 of Fig. 1, showing the adjustable diaphragm for the spectrum which may also be used eclipsing the light on the eye under observation.
Figure 16:
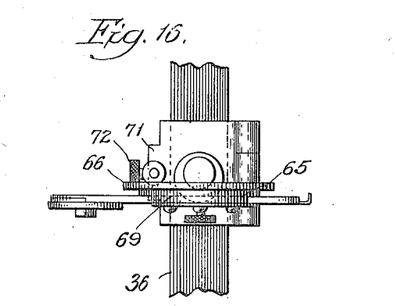
Fig. 16 is a plan of the parts shown in Fig. 15.

An adjustable diaphragm 65 (Figs. 1, 15 and 16) sustained in a mount 66, is disposed in front of the spectrum producer. This diaphragm comprises relatively adjustable members 67 and 68 whereby an opening of desired width for the pencil of light may be provided and these members are conjointly slidable so that the slit or opening may be shifted laterally to cut off any part of the spectrum. The diaphragm members 67 and 68 are slidable in a guide 69 which is rotatably held on mount 66, so that this diaphragm, as well as serving as a cut-off for chromatic light, may be used to eclipse the lighted area on the retina in different meridians or to cause the image on the retina to fade in different angles. A scale 70 on mount 66 indicates the meridian at which the projected light entering the eye will be cut off. Mount 66 is sustained by a bracket 71 which is slidable and held in assigned position by set-screw 72.

A selective cut-off for the spectrum (Figs. 11, 12, 13 and 14) is mounted in front of the diaphragm 67. This cut-off consists of a transverse series of slides 73, which are vertically guided in a frame 74. The contiguous edges of these slides are lapped to form light-tight joints between them. A slide 73 is provided for each color of the spectrum. The upper end of each slide is extended to form a handle 75 and each slide is separately adjustable into or out of operative position. An important advantage in this selective cut-off is that any one or any combination of colors of the spectrum may be projected. For example, any slide may be individually raised for the projection of monochromatic light or any two or more of the slides may be raised for the formation of a mixed color. The frame 74 is carried by a bracket 76 which is longitudinally adjustable on the supporting bar 36 and is held in assigned position thereon by a set-screw 77. This selective cut-off exemplifies a device by which the colors of the spectrum may be individually controlled for projection, so that any combination of them may be controlled for producing any mixed color of light.

Figures 9, 10:
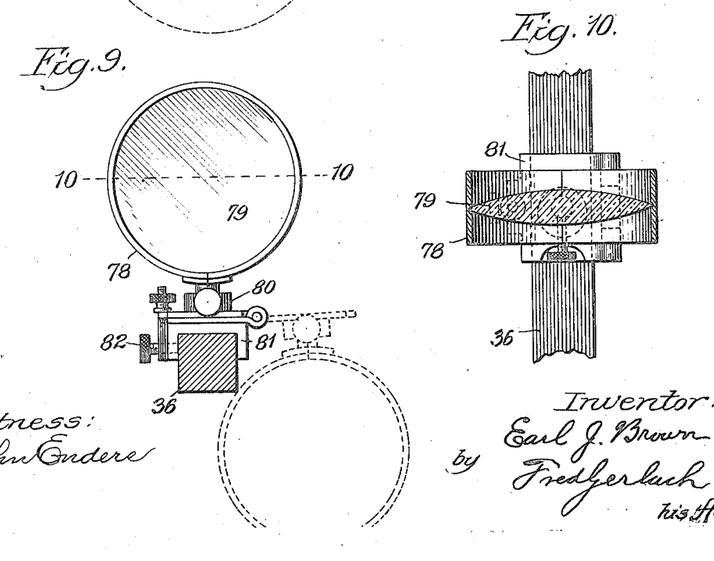
Figure 11:
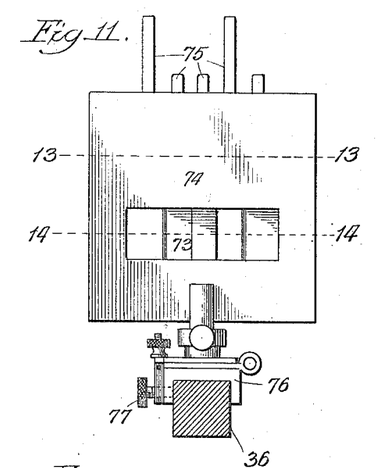
Fig. 11 is a section taken on line 11—11 of Fig. 1, showing the selective cut-off for the different colors of light of the spectrum.
Figure 12:
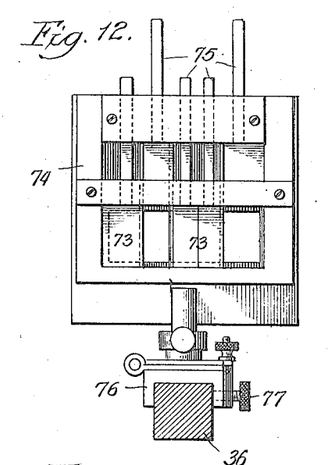
Fig. 12 is a section taken on line 12—12 of Fig. 1, showing the other side of said selective cut-off.
Figure 13:
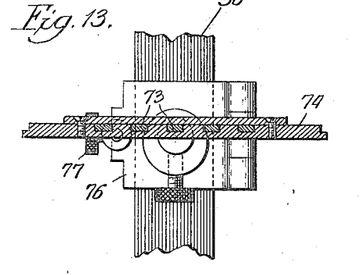
Fig. 13 is a section taken on line 13—13 of Fig. 11.
Figure 14:
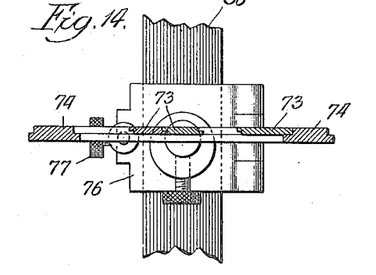
Fig. 14 is a section taken on line 14—14 of Fig. 11.

A ring 78 (Figs. 1, 9 and 10) containing a magnifying lens 79 for recombining different wave-lengths of the spectrum, is supported in front of the cut-offs, so that any mixture of two or more colors can be projected into the eye under observation. Tube 78 is carried by a suitable mount 80 on a bracket 81, which is slidable longitudinally on the supporting bar 36 and is held in assigned position thereon by a set-screw 82. This exemplifies means for recombining different wave-lengths of the spectrum to produce any mixed color from the spectrum colors.

Figure 5:
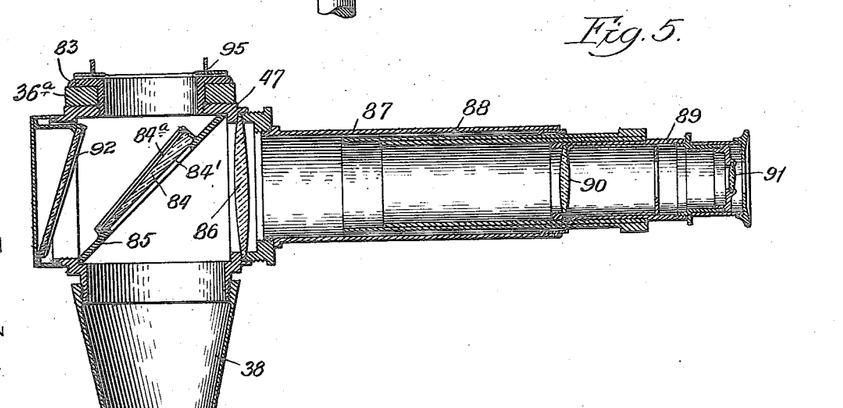
Fig. 5 is a horizontal section on an enlarged scale taken on line 5—5 of Fig. 4, showing operator's observation device, the eye-piece for the eye under observation, and the prism for receiving the image of the eye.

Casing 47 is connected to an upward extension 36ª on the supporting bar 36, by a sleeve 83 (Fig. 5). This sleeve permits rotation of the casing to permit the eye-piece for the observer to be swung in a vertical plane. A prism 84 is sustained by a diagonal wall 85 in the casing 47. The pencil of light passes through sleeve 83, prism 84 and eye-piece 38 into the eye under observation. This prism reflects an image of the illuminated area in the eye for observation through a viewing device disposed at one side of the prism and the incident pencil of light. The image is produced by the emergent pencil of light on the primary face 84' of the prism. A characteristic of prism 84 is that its secondary face 84ª, being at a different inclined angle from the primary face, will reflect the secondary image away from the observer's eye, thus preventing duplication of images.

The observer's viewing device comprises a magnifying lens 86 mounted in one side of the casing 47, telescopic tubes 87, 88 and an eye-piece 89, containing lenses 90 and 91. The telescopic sections are provided so the eye-piece may be correctly focused for viewing the image upon the prism and the eye-piece is removable for substitution of different eye-pieces for making different tests. This device exemplifies one for viewing the image produced by the emergent pencil of light on prism 84. A reflector 92 of black glass is mounted in casing 47 and is properly disposed to reflect the light which is diverted or reflected from the incident pencil of light by the face 84ª of prism 84, so it cannot enter the observer's eye at the viewing device. This glass 92 gives a neutral or dark background beyond the prism 84.

Figure 6:
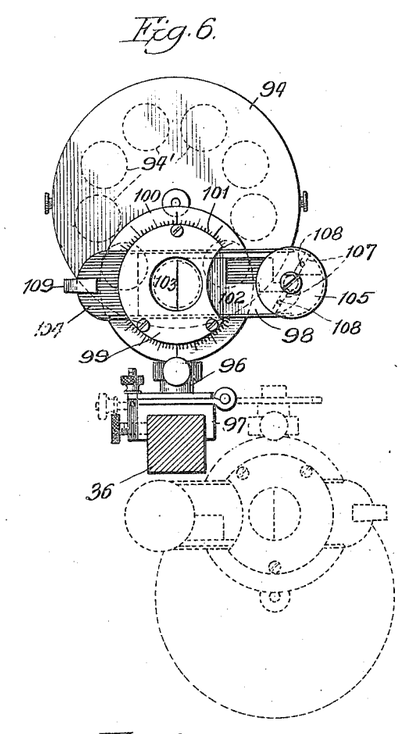
Fig. 6 is a section taken on line 6—6 of Fig. 1, showing the device for eclipsing the light in retinal illumination, in making a retinoscopic test.
Figure 7:
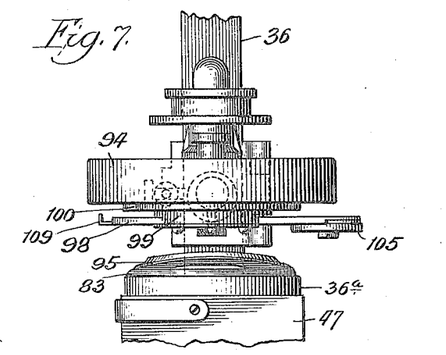
Fig. 7 is a plan of the parts shown in Fig. 6.
Figure 8:
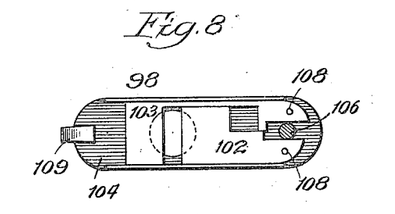
Fig. 8 is a detail of the sliding element of the device shown in Fig. 6.

A casing 94 containing a battery of corrective lenses 94' (Fig. 6) adapted to be rotated into position to bring any one of them into the pencil of light, is mounted in the rear of the casing 47. A lens-holder 95 may also be provided on sleeve 83 of the casing 47 for use when desired. The casing 94 is sustained upon a mount 96 which is connected to a bracket 97 which is slidable on the supporting-bar 36, so that the lens in the pencil of light may be shifted into focus.

In some instances, it may be desired to effect the progressive eclipsing of the illuminated area in the eye by operating a diaphragm or slide between the corrective lens and the prism and for this purpose a slide 98 (Figs. 1, 6, 7 and 8) is mounted in a member 99, which is rotatably held on carrier 94 by a ring 100. A scale 101 on the ring 100 indicates the angle in or meridian across which the slide is being operated, it being understood that by rotation of the guide 99, in which the slide is mounted, the angle, in which the light is eclipsed or the fading of the light in the different meridians may be effected. Slide 98 consists of two relatively adjustable members 102 and 103 and a plate 104 in which the members are slidable. A disk 105 is pivoted on a stud 106 on plate 104 and has oppositely disposed radial slots 107 into which studs 108 on the members respectively, are extended. By rotation of the disk, the slit or opening between the members may be varied in width. A handle 109 is connected to plate 104 and by manipulating the handle, the slide can be rotated to vary the meridian across which it slides and the entire slide may be operated across the incident pencil of light to eclipse the illuminated area in the eye. Slide 65 is of the same construction as the slide 98.

Figure 3:
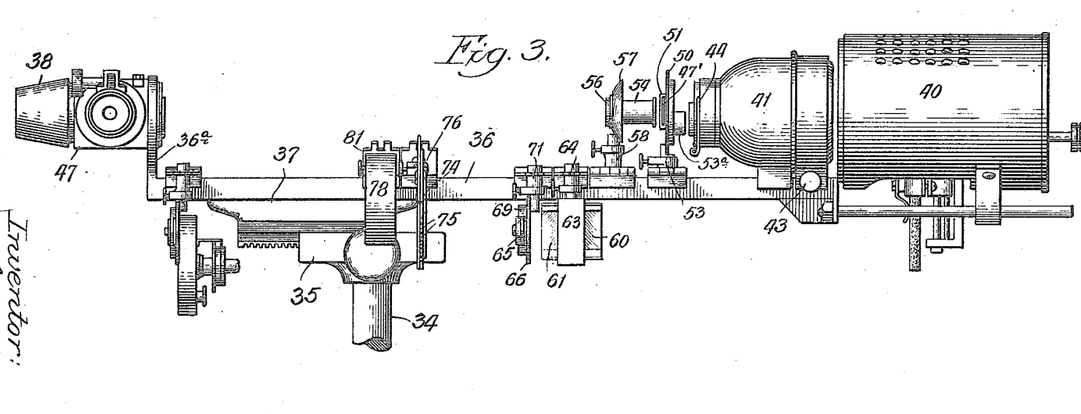
Fig. 3 is a similar view showing the parts in position for use as an ophthalmoscope with white light or as a corneal-microscope.

The instrument, in its entirety, is designed to comprise devices for making retinoscopic, ophthalmoscopic, chromatic, monochromatic and corneal tests, and for the purpose of permitting the devices not to be used in a given test are sustained so they can be withdrawn from the light-path. The mount 63 for the spectrum-producer is connected to its bracket 64 by a hinge 111 (Fig. 17) and a hinged screw 112 and nut 113, removably secure the mount in operative position. The hinge permits the spectrum-producer to be swung out of the projected light, as shown in Fig. 3, when the mount is released by the nut 113. The mount 66 for the spectrum diaphragm and eclipsing device 65, the mount 74 for the selective cut-off, the mount 80 for the magnifying and combining lens 79, and the mount 94, which carries the corrective lens-holder and the eclipsing slide 98, are each similarly connected to their respective brackets on the supporting-bar 36, so that each of these devices may be swung into or out of operative position. The longitudinal adjustment of these brackets permits each device to be set at the proper point for any test.

Figure 2:
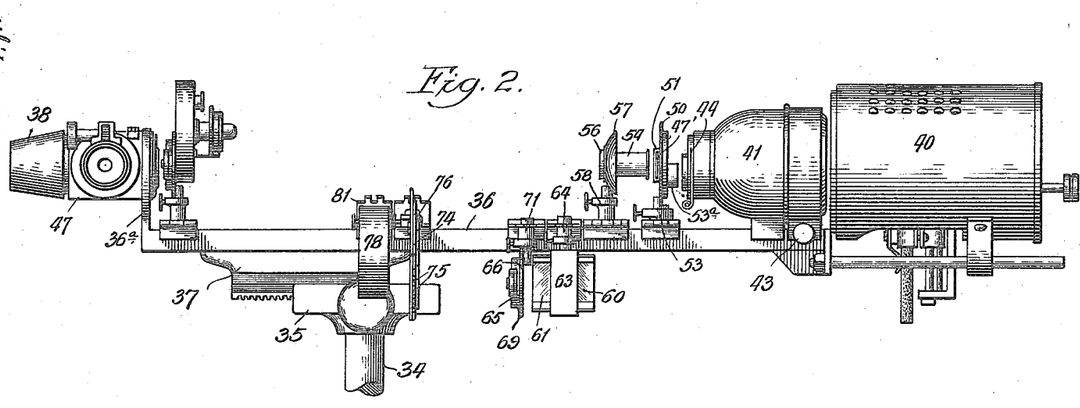
Fig. 2 is a side elevation showing the parts in position assumed in making a retinoscopic test with white light.

*Retinoscopic test.*—To make a retinoscopic test with white light, the devices shown in operative position, as illustrated in Fig. 2, are used. A pencil of light will be projected, under control of the condenser diaphragm, and the slide 47' for forming the stenopaic slit, through the paralleling and magnifying lenses 55 in the holder 54, thence through the opening in slide 98, the prism 84 and into the eye under observation at the eye piece 38. By manipulating the slide 98 across the pencil of light, and in different meridians, the illuminated area of the eye will be progressively eclipsed or caused to fade across the retina. An image of the effect on the illuminated area of the retina will be formed on the primary face 84' of the prism 84 by the emergent pencil of light and this image and the effect of the eclipsing can be observed by the operator at the eye-piece 89. The image will be magnified by the viewing means, so that refractive errors may be more readily determined, than when no magnifying occurs in the test. By interposing in the pencil of light a corrective lens in the holder 94 or an additional lens in the holder 95, the refractive errors may be neutralized and the correction observed by the operator. If preferred, for retinoscopic tests, the mount 66 with the eclipsing device therein, may be set into operative position and its slide 65 employed for eclipsing the illuminated area of the eye, in lieu of the slide 98.

Figure 1:
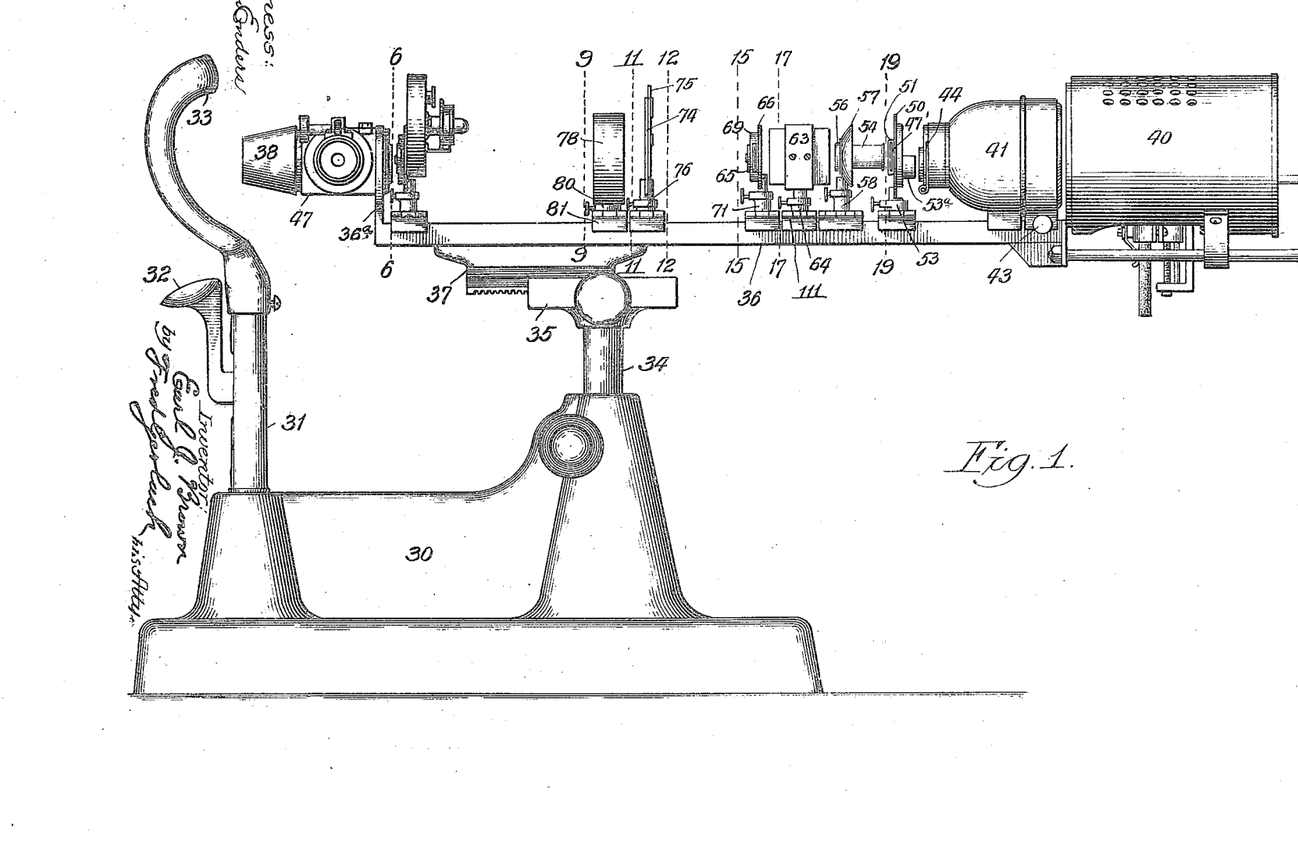
Figure 1 is a side elevation of an instrument embodying the invention.

For a retinoscopic test with chromatic or monochromatic light, the devices are adjusted into position illustrated in Fig. 1 that is, additionally, the selective cut-off, spectrum producer and combining lens 79 are set in operative position. By manipulating the cut-off slides 73, all but one or any combination of the colors of the spectrum may be projected to the eye-piece 38. When more than one of the slides 73 are open or raised, the lens 79 will combine different wave-lengths of the spectrum and project the desired mixed color. In making a chromatic retinoscopic test, either the slide 65 or slide 98 may be used for eclipsing or progressively cutting off the light in different meridians. It will be understood that in chromatic tests, suitable corrective lenses and a suitable eye-piece 89 will be substituted.

*Ophthalmoscopic test.*—For an ophthalmoscopic test with white light, the devices are set, as shown in Fig. 3, a suitable operator's eye-piece being substituted for that shown in Fig. 5. In this test, the corrective lens mount, the spectrum-producer, the slide mount 66, the selective cut-off, the combining lens 79 are swung out of the light path or into inoperative position.

Figure 4:
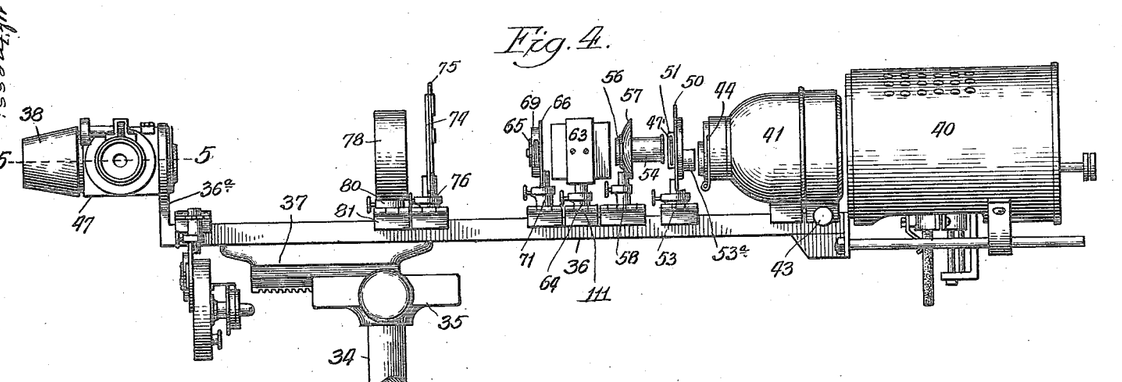
Fig. 4 is a side elevation showing the parts in position for an ophthalmoscopic test with chromatic light.

For an ophthalmoscopic test with chromatic or monochromatic light, the devices are set into position shown in Fig. 4. By setting the cut-offs 73 to produce the desired color or mixed color of light, the desired color will be projected to the eye under observation.

*Monochromatic test.*—By setting the cut-offs to produce any wave-length entering the eye under observation, a test for the intolerance of the eye for different wave-lengths or colors may be made to determine the tint or color of lens that will give relief.

*Corneal microscope.*—When the devices are set in the position illustrated in Fig. 3, the instrument may, by placing a sufficiently powerful lens in the observation tube 87, be used as a corneal-microscope.

The invention thus exemplifies an instrument for testing eyes adapted for retinoscopic tests and in which a magnified image of the illuminated area of and the fading of light on the retina may be observed. Also one adapted for chromatic and monochromatic tests, either ophthalmoscopic or retinoscopic. The instrument, in its entirety, is one adapted for a wide range of tests.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. In an instrument for testing eyes, the combination of means for projecting a pencil of light into an eye under observation, means for progressively eclipsing the lighted area in the eye in different meridians, means in the emergent pencil of light for deflecting an image of the lighted area of the observed eye, and means for viewing said image.

2. In an instrument for testing eyes, the combination of means for projecting a pencil of light into an eye under observation, means for progressively eclipsing the lighted area in the eye in different meridians, a prism in the emergent pencil of light for deflecting an image of the lighted area in the observed eye, and means at one side of the light for viewing said image.

3. In an instrument for testing eyes, the combination of means for projecting a pencil of light into an eye under observation, means for progressively eclipsing the lighted area in the eye in different meridians, means in the emergent pencil of light for deflecting an image of the lighted area in the observed eye, and means for viewing said image, said eclipsing-means being removable from the light path.

4. In an instrument for testing eyes, the combination of means for projecting a pencil of light into an eye under observation, means for eclipsing the lighted area of the eye in different meridians, means in the emergent pencil of light for deflecting an image of the lighted area in the observed eye, means for holding a corrective lens in the path of the projected pencil of light, and means for viewing said image.

5. In an instrument for testing eyes, the combination of means for projecting a pencil of light into an eye under observation, means for eclipsing the lighted area in the eye in different meridians, means in the emergent pencil of light for deflecting an image of the lighted area in the observed eye, means for holding a corrective lens in the path of the projected pencil of light, and means at one side of the light for viewing said image.

6. In an instrument for testing eyes, the combination of means for projecting a pencil of light into an eye under observation, means for eclipsing the lighted area in the eye in different meridians, a prism in the emergent pencil of light for deflecting an image of the lighted area in the observed eye, means for holding a corrective lens in the path of the projected pencil of light, and means at one side of the light for viewing said image.

7. In an instrument for testing eyes, the combination of means for projecting a pencil of light into an eye under observation, means for progressively eclipsing the lighted area in the eye in different meridians, means in the emergent pencil of light for deflecting an image of the lighted area in the observed eye, means for holding a corrective lens in the path of the projected pencil of light, and means for viewing said image, said eclipsing-means being removable from the light path.

8. In an instrument for testing eyes, the combination of means for projecting a pencil of light into an eye under observation, means for progressively eclipsing the lighted area in the eye in different meridians, means in the emergent pencil of light for deflecting an image of the lighted area in the observed eye, means for holding a corrective lens in the path of the projected pencil of light, and means for viewing said image, said eclipsing means being pivotally mounted to be swung into or out of the light path.

9. In an instrument for testing eyes, the combination of means for projecting a pencil of light into an eye under observation, means for eclipsing the lighted area of the eye in different meridians, means for deflecting an image of the lighted area in the observed eye, and magnifying means for viewing said image.

10. In an instrument for testing eyes, the combination of means for projecting a pencil of light into an eye under observation, means for eclipsing the lighted area in the eye in different meridians, means in the emergent pencil of light for deflecting an image of the lighted area in the observed eye, and magnifying means at one side of the light for viewing said image.

11. In an instrument for testing eyes, the combination of means for projecting a pencil of light into an eye under observation, means for eclipsing the lighted area in the eye in different meridians removably sustained in the light path, means in the emergent pencil of light for deflecting an image of the lighted area in the observed eye, and means for viewing said image.

12. In an instrument for testing eyes, the combination of means for projecting a pencil of light into an eye under observation, means for eclipsing the lighted area in the eye in different meridians, means in the emergent pencil of light for deflecting an image of the lighted area in the observed eye, means for viewing said image, and spectrum-producing means removably sustained in the path of the projected pencil of light.

13. In an instrument for testing eyes, the combination of means for projecting a pencil of light into an eye under observation, a prism in the emergent pencil of light for deflecting an image of the lighted eye, means for viewing said image, and means for preventing light reflection by the prism into the line of observation.

14. In an instrument for testing eyes, the combination of means for projecting a pencil of light into an eye under observation, a spectrum producer, separate, operable individual cut-offs for the several colors of light in the spectrum respectively, whereby any one or plurality of colors may be controlled, means for deflecting an image of the illuminated area in the eye, and means for viewing the image.

15. In an instrument for testing eyes, the combination of means for projecting a pencil of light into an eye under observation, a spectrum producer, separate, operable individual cut-off slides for the several colors of light in the spectrum respectively, whereby any one or plurality of colors may be controlled, means for deflecting an image of the illuminated area in the eye, and means for viewing the image.

16. In an instrument for testing eyes, the combination of means for projecting a pencil of light into an eye under observation, a spectrum producer, separate operable individual cut-offs for the several colors of light in the spectrum respectively, whereby any one or plurality of colors may be controlled, a mount for said cut-offs removable from the light path, means for deflecting an image of the illuminated area in the eye, and means for viewing the image.

17. In an instrument for testing eyes, the combination of means for projecting a pencil of light into an eye under observation, a spectrum producer, separate, operable individual cut-off slides for the several colors of light in the spectrum respectively, whereby any one or plurality of colors may be controlled, a mount for said slides pivotally sustained so it may be swung out of the light path, means for deflecting an image of the illuminated area in the eye and means for viewing the image.

18. In an instrument for testing eyes, the combination of means for projecting a pencil of light into an eye under observation, a spectrum producer, separate, operable individual cut-offs for the several colors of light in the spectrum respectively, whereby any one or any plurality of colors may be controlled, a recombining lens between the cut-offs and the eye under observation, means for deflecting an image of the illuminated area in the eye, and means for viewing the image.

19. In an instrument for testing eyes, the combination of means for projecting a pencil of light into an eye under observation, a spectrum-producer, separate operable individual cut-offs for the several colors of light in the spectrum respectively, and whereby any one or any plurality of colors may be controlled, a recombining lens between the cut-offs and the eye under observation, a mount for the lens, movable out of the light path, means for deflecting an image of the illuminated area in the eye, and means for viewing the image.

20. In an instrument for testing eyes, the combination of means for projecting a pencil of light into an eye under observation, a spectrum producer, separably operable individual cut-offs for the several colors of light in the spectrum respectively, and whereby any one or any plurality of colors may be controlled, a recombining lens between the cut-offs and the eye under observation, means for deflecting an image of the illuminated area in the eye, and means for viewing the image, said spectrum-producer, cut-offs and lens being removable from the light path.

21. In an instrument for testing eyes, the combination of means for projecting a pencil of light into an eye under observation, a spectrum-producer, a pivotally sustained mount for the producer, separably operable individual cut-offs for the several colors of light in the spectrum respectively, and whereby any one or any plurality of colors may be controlled, a pivotally sustained mount for the cut-offs, a recombining lens between the cut-offs and the eye under observation, a pivotally sustained mount for said lens, means for deflecting an image of the illuminated area in the eye, and means for viewing the image.

EARL J. BROWN.

Copies of this patent may be obtained for five cents each, by addressing the "Commissioner of Patents, Washington, D. C."